Sept. 11, 1945.  W. F. ALLER  2,384,518
GAUGING DEVICE
Filed Aug. 28, 1942  10 Sheets-Sheet 6

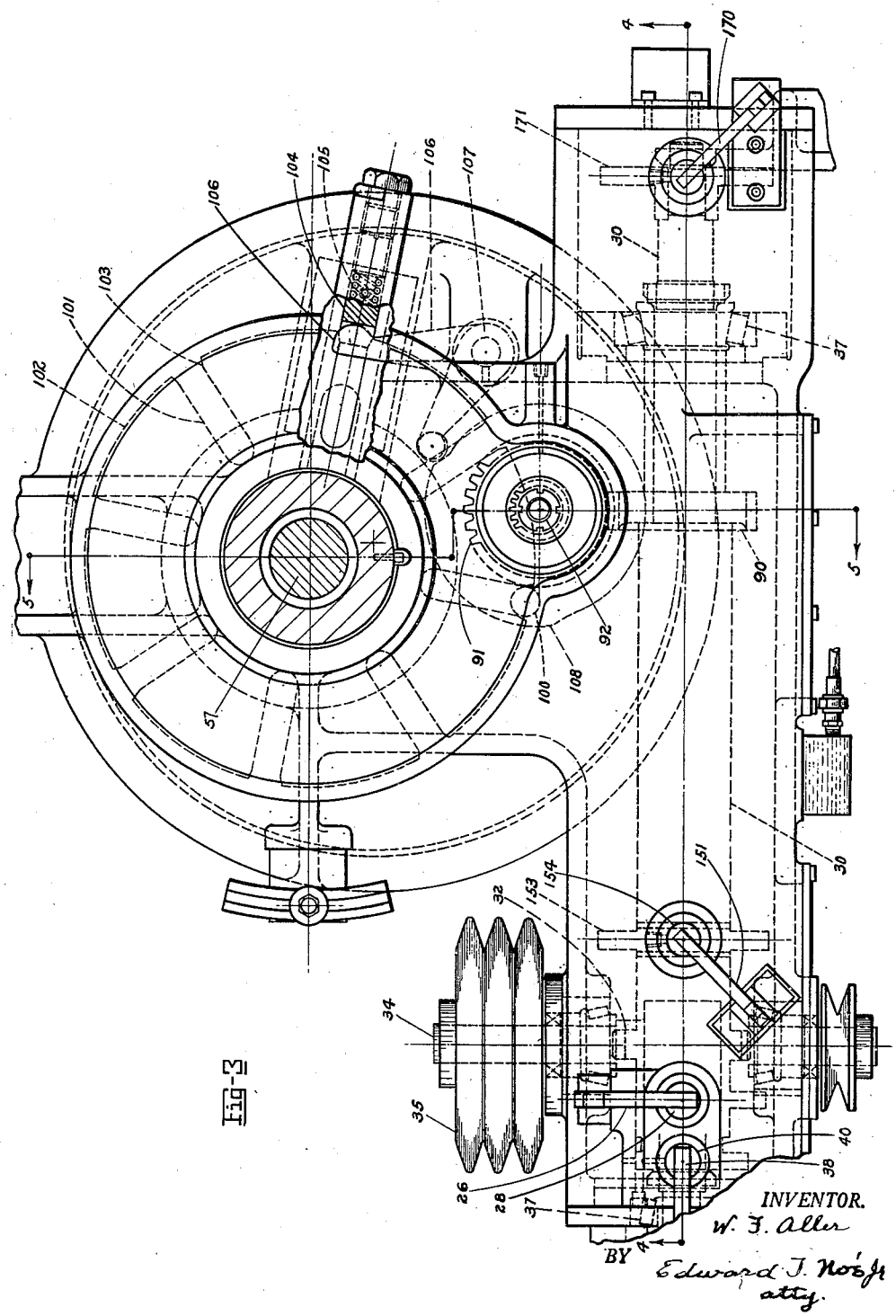

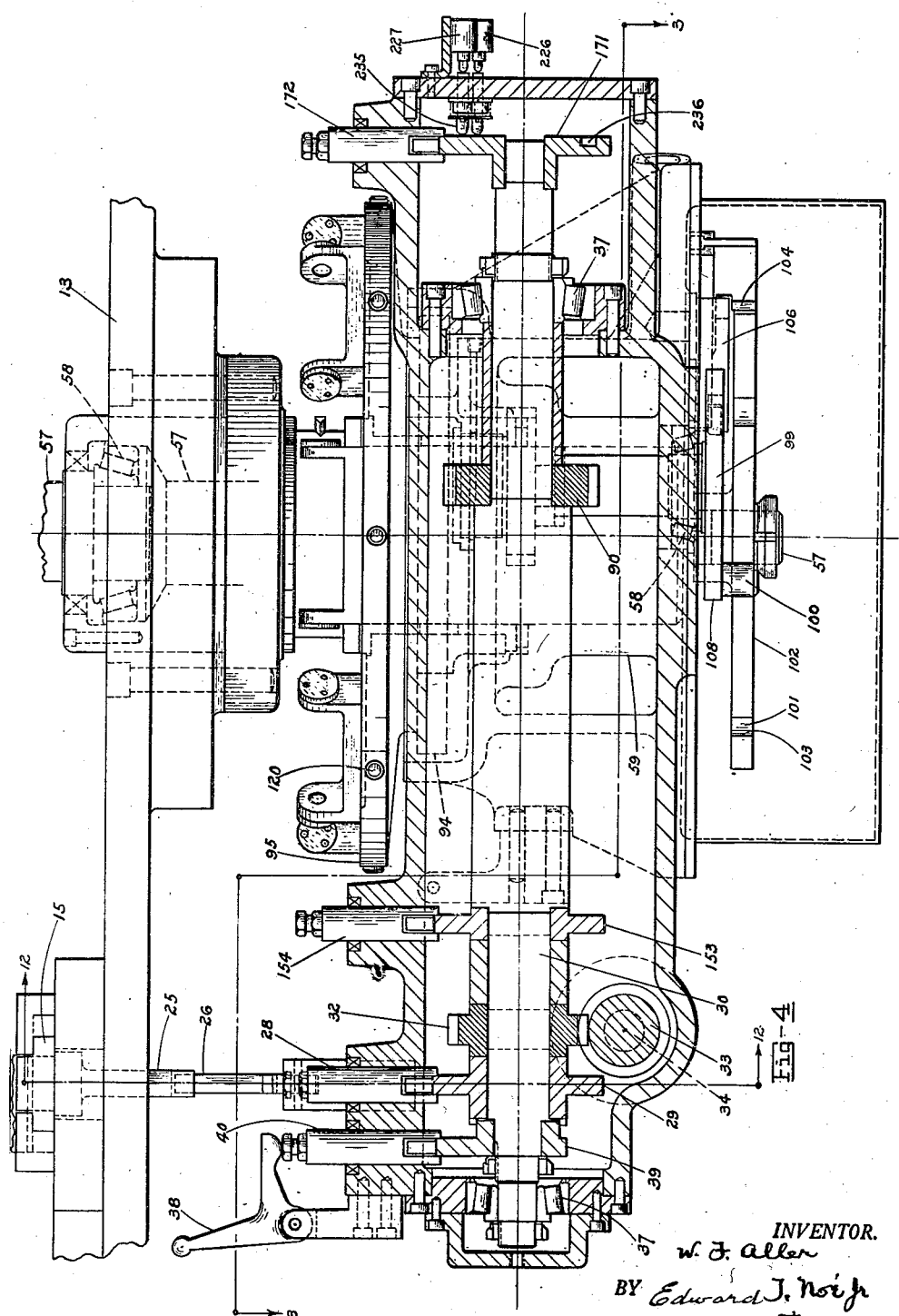

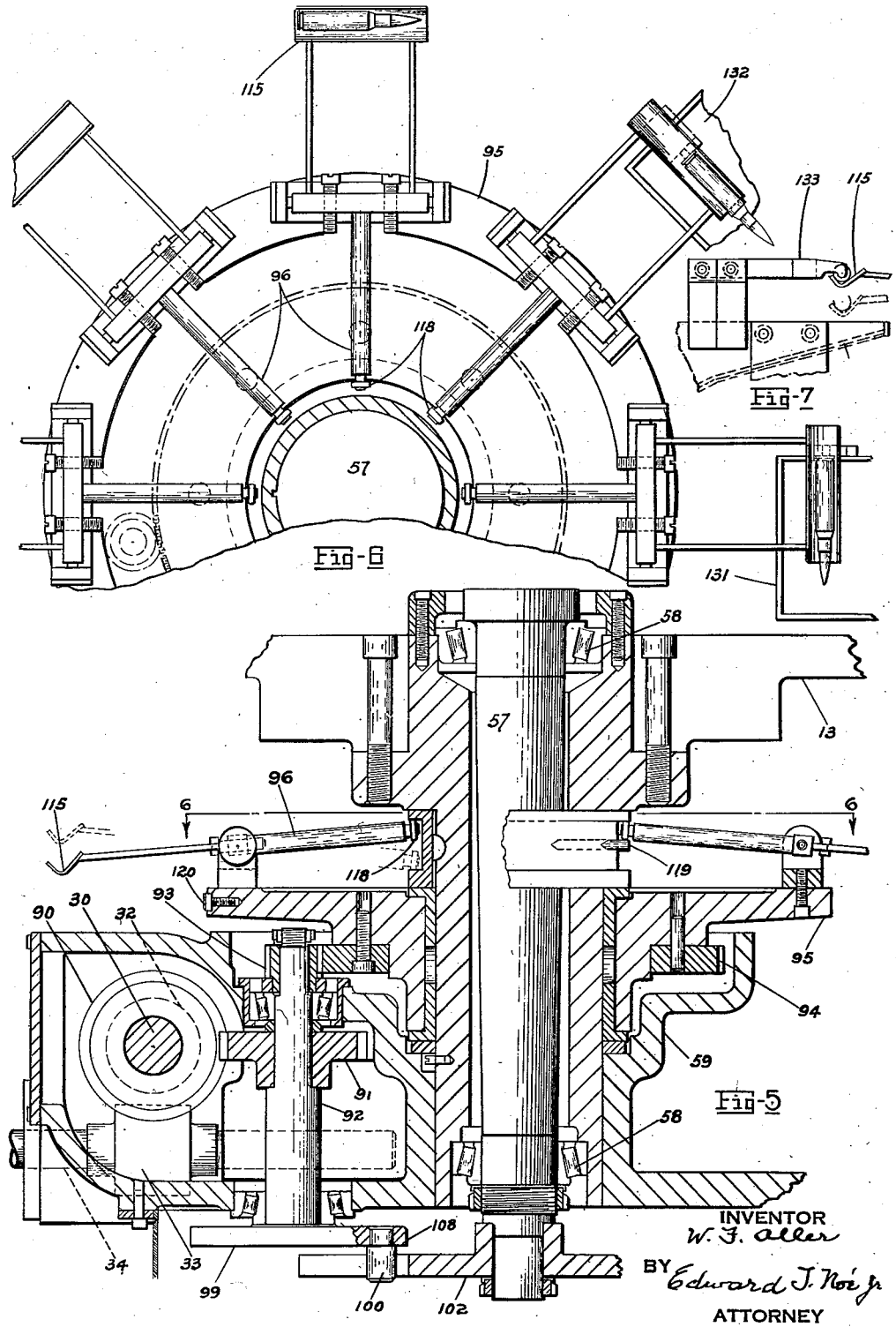

INVENTOR
W. F. Aller
BY Edward T. Noe Jr.
ATTORNEY

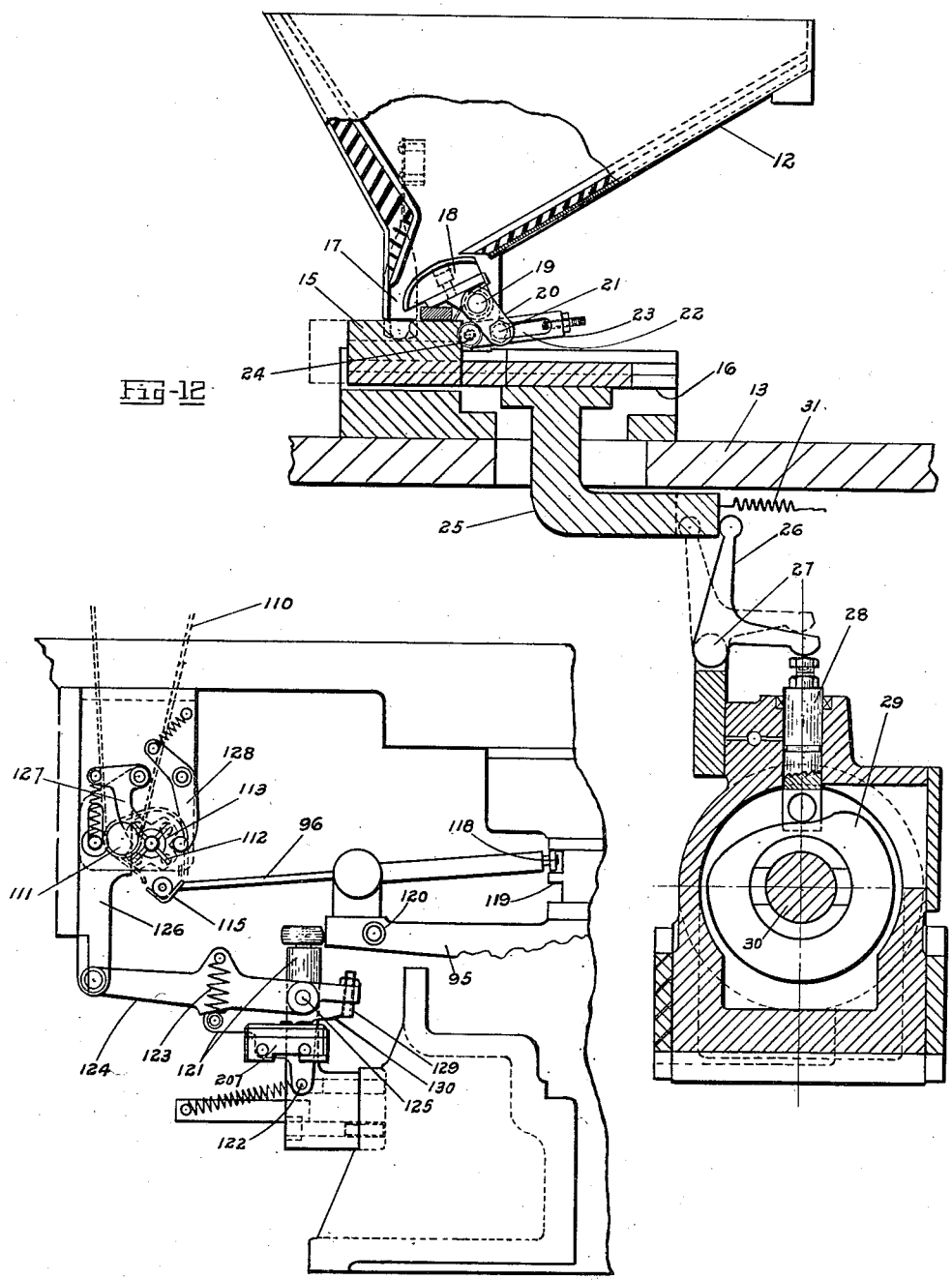

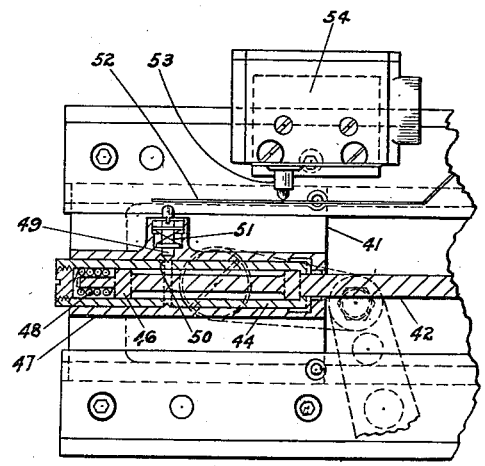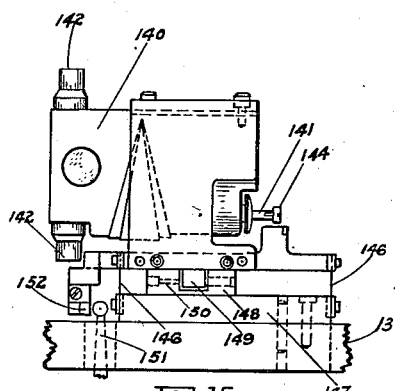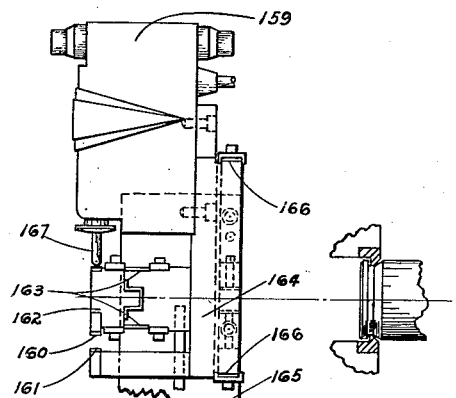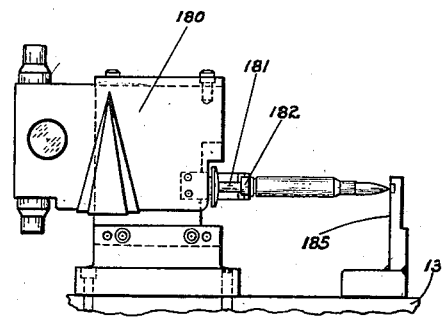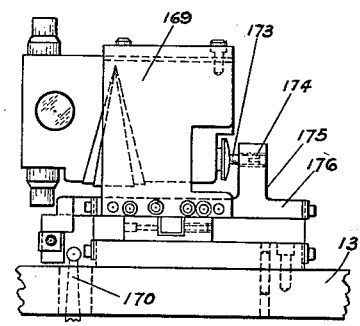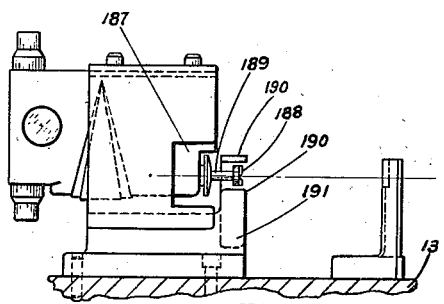

Patented Sept. 11, 1945

2,384,518

UNITED STATES PATENT OFFICE 2,384,518

GAUGING DEVICE

Willis Fay Aller, Dayton, Ohio, assignor to The Sheffield Corporation, Dayton, Ohio, a corporation of Ohio Application August 28, 1942, Serial No. 456,513

8 Claims. (Cl. 209—75)

This invention relates to gauging apparatus.

One object of the invention is the provision of an automatic gauging apparatus in which articles to be gauged are successively moved in a carrier to a gauging station or to successive gauging stations and assorted according to size with a high degree of gauging accuracy, dependability and speed of operation.

Another object is the provision of a gauging apparatus in which articles to be gauged are automatically positioned in a moving carrier, which carries the articles through successive gauging stations in which different very accurate gauging operations are performed, and following each gauging station those articles are automatically ejected that fail to meet the required gauging test.

Another object is the provision of a gauging apparatus of the character mentioned and embodying an automatic positive ejecting means mounted on the article carrier adjacent each article thereon and automatically operated under the control of the gauging units by rotation of the carrier.

Another object is the provision of a gauging apparatus in which the supply of the articles, the successive gauging operations and the ejection and grouping of the articles according to the results of the tests is entirely automatic and effected in a dependable, accurate manner.

Another object resides in a gauging apparatus in which articles are automatically positioned in a carrier at a supply or loading station and are automatically ejected from the carrier before they reach the first gauging station if they are improperly positioned.

Another object is the provision of a gauging apparatus in which articles to be gauged are moved by a carrier, which rotates about a vertical axis, from a supply station to successive gauging stations and then ejected and received by a rotatable weighing mechanism arranged below the carrier and coaxial therewith.

Other objects and advantages of the invention will be apparent from the following description, the appended claims and the accompanying drawings.

In the drawings, in which the same reference characters have been applied to like parts in the several views;

Fig. 3 is a horizontal section taken below the top of the structure on the line 3—3 of Fig. 4;

Fig. 4 is a vertical section on the line 4—4 of Fig. 3;

Fig. 5 is a vertical section on the line 5—5 of Fig. 3;

Fig. 6 is a horizontal section of a portion of Fig. 5, on the line 6—6 of that figure;

Fig. 7 is a detail view of the end of one of the weighing arms and its associated cartridge stop;

Fig. 12 is a vertical section on the line 12—12 of Fig. 4, showing part of the loading mechanism;

Fig. 13 is a vertical elevation of a portion of the mechanism showing the cartridge supply to the weighing device;

Fig. 14 is a plan view, partly in horizontal section, showing the cartridge feed plunger;

Fig. 15 is a side elevation showing the gauge head and its associated parts at the first gauging station;

Fig. 16 is a side elevation showing the gauge head at the second gauging station;

Fig. 16a is a detail view showing the gauging members of Fig. 16, and a portion of the cartridge engaged thereby.

Fig. 17 is a side elevation showing the gauge head at the third gauging station;

Fig. 18 is a side elevation showing the gauge head at the fifth gauging station;

Fig. 19 is a side elevation showing the gauge head at the sixth gauging station;

Referring more particularly to the drawings, in which a preferred form of the invention has been illustrated as embodied in a gauging apparatus for simultaneously gauging several different dimensions of a series of workpieces such as cartridges or the like, as they are rotated, step by step, in a common carrier, the gauging apparatus comprises a suitable housing 10, which carries a rotatable carrier 11 adapted to receive a number of cartridges and move them sequentially into gauging positions, where different dimensions of the workpieces are gauged. As herein shown, the workpieces are in the form of cartridges, and consequently the carrier is provided with a series of article receivers in the form of barrels into which the cartridges fit, and from which opposite end of the cartridges project so that these end portions are accessible in the successive gauging operations.

Following each gauging operation, if the cartridge gauged departs from a required size standard, it is automatically ejected from the barrel in which it is held in the carrier, as the carrier rotates to the next gauging station. Those cartridges that conform to the requirements of the several gauging stations remain in the carrier and are ejected at a final station, as will be presently described. The cartridges that are ejected at this final station, having met the dimension requirements, then travel to a weighing device which automatically separates cartridges that are too light to meet the required weight specifications, from those that are sufficiently heavy.

Figure 1:
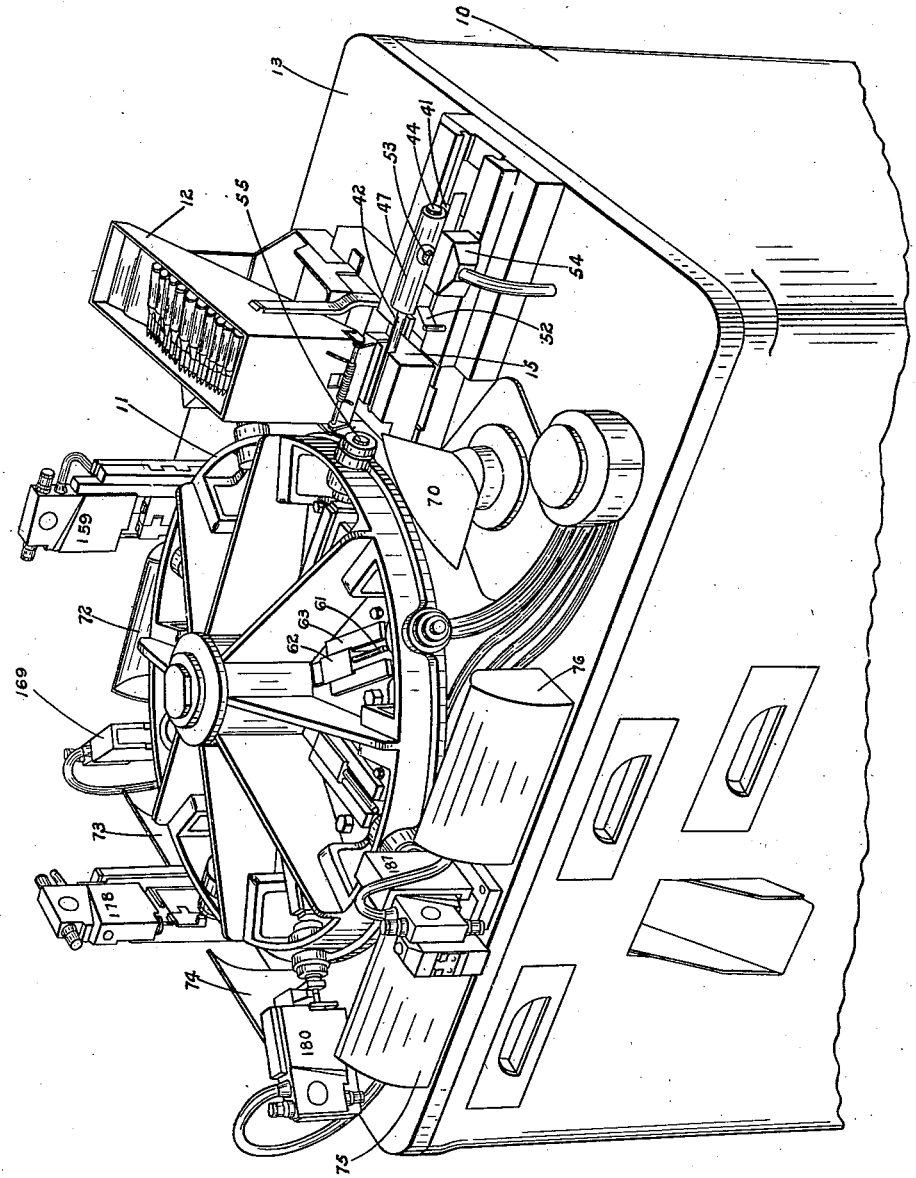
Fig. 1 is a perspective view of a gauging apparatus embodying the present invention.

The cartridges to be gauged are placed in a hopper 12 carried by the table 13 of the housing. They drop from this hopper, one at a time, from the space 17 (see Fig. 12) to a cartridge receiving groove in a slide block 15 which is mounted for reciprocation on guides 16 arranged on the table. Fig. 1 shows the slide block in its retracted position ready to receive a cartridge. It then carries the cartridge out to a position in line with a barrel on the rotatable carrier, at the supply station of the carrier, and the rear end of the block will then cover the passage at the lower end of the hopper 12. As the slide block is moved back, it receives another cartridge from the space 17 and subsequently supplies it to the rotatable carrier. At the end of the forward movement of the slide 15 it gives a rocking motion to a rock plate 18 which constitutes a movable lower portion of the chute. This rocking plate 18 is pivotally carried at 19 and has fixed to it an arm 20 provided with a bolt 21. The bolt 21 extends through a slot 22 in an arm 23 which is pivoted to the slide at 24 so that as the slide moves forwardly to extended position it rocks the member 18 to free the mass of cartridges in the hopper, so that one of the loosened cartridges will be sure to roll down into the space 17 and can then drop into the groove of the slide block if the slide block is below the space. The slide block is fixed to bar 25 which extends through a slot in the table 13. It is operated in one direction by a bell crank lever 26 pivotally supported at 27 on a stationary part of the housing, one end of the lever having a reciprocatory movement under the action of a cam operated plunger 28 which is lifted at the right time in the sequence of operations by cam 29 on a cam shaft 30. A spring 31 returns the slide block to retracted position, when the descent of the plunger 28 is permitted by the lower portion of the cam 29. The cam shaft 30 as shown in Figs. 3 and 4 is rotatably supported by suitable bearings 37 in the housing structure, below the table, and is driven by a gear 32 meshing with gear 33 on a power operated shaft 34. The latter is provided with a pulley wheel 35, connected by a suitable driving belt to a motor 36 which is shown diagrammatically in Fig. 20. As will be understood, one revolution of the cam shaft 30 produces one complete cycle of forward and return movement of the slide block 15.

One revolution of the shaft 30 also causes a forward and backward movement of another bell crank lever 38, by means of a cam 39 and a cam operated plunger 40. The upwardly extending arm (see Fig. 4) of the lever 38 is connected to a plunger operating slide block 41 by means of a pivoted link connection, not shown. The relative timing of the cams 29 and 39 is such that after the slide block 15 moves a cartridge into alignment with a barrel on the carrier 11, the lever 38 is operated to cause axial travel of block 41 and plunger 42 so that the cartridge is pushed into the barrel or article receiver of the carrier which at that time is in position to receive it.

Figure 10:
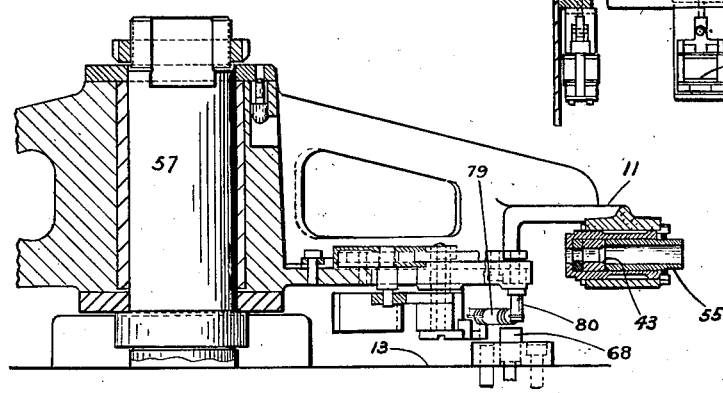
Fig. 10 is a vertical section on the line 10—10 of Fig. 2.

There is a yielding connection between the plunger 42 and the slide block 41 although normally these two parts operate together without relative movement to supply the cartridge into a barrel of the carrier so that the tapered end of the cartridge shell is received in the correspondingly tapered portion 43 of one of the barrels 55 (see Fig. 10). In this position of the cartridge, the end of a normal bullet is slightly spaced from a stationary stop lug 45 mounted on the table 13 in alignment with the end of the barrel. If the cartridge is too long from the tapered end of the cartridge shell to the end of the bullet or if the cartridge is too long from the tapered end of the shell to the outer end of the shell the plunger 42 will be stopped before it gets to the end of its normal stroke, while the forward movement of the slide block 41 continues. To permit this relative movement the end of the plunger 42 takes the form of a piston 46 (see Fig. 14) operating in a sleeve 44 which is slidably arranged in a tubular element 47 forming part of the slide block 41. A spring 48, strong enough to apply a normal feeding force to the cartridges, is arranged between the end of the piston 46 and the outer end of the sleeve 44. The sleeve 44 is normally held against axial movement in the barrel by a spring-pressed detent 49 engaging an annular groove 50 in the sleeve. A spring 51 holds the detent in the groove under normal conditions while the cartridge is being fed into the carrier. However if the cartridge is too long from the tapered portion to the outer end of the cartridge, or if the bullet end is too long so that it abuts against the stop lug 45, the spring 51 can yield to permit the full stroke of the slide block 41 together with the element 47. When this yielding movement of the detent occurs there is a relative rearward movement of the piston 46 and sleeve 44, causing the detent 49 to be cammed outwardly and thus press outwardly and move a blade 52 which depresses a button 53 of a switch 54. This opens the switch to control the actuation of certain mechanism so that when the carrier rotates, moving counter-clockwise as viewed in Fig. 2, the cartridge will be automatically ejected and carried radially outwardly so that it will not travel on to the first gauging station.

The carrier 11 is rotatably mounted for movement on a vertical axis, being supported by a shaft 57 rotatably carried by anti-friction bearings 58. The lower bearing 58 is arranged in a bearing 59 forming part of the housing. A peripheral portion of the carrier supports a series of article receiving chambers or barrels 55 extending radially and uniformly spaced apart. As herein shown there are eight of these chambers or barrels, all of similar construction, thus providing eight stations one of which is the supply or loading station, followed by six different gauging stations, the eighth station being an ejection station where the cartridges that meet the required dimension measurements are ejected.

Arranged adjacent each of the article receiving chambers is an ejection plunger 61, in line with the axis of the chamber and adapted for outward movement from a normally retracted position. Each plunger 61 is fixed to a slide block 62 which is reciprocally mounted on guide ways 63 on the carrier 11. A downwardly extending pin 64 on each of the slide blocks operates in a slot 65 of a lever 66, supported for pivotal movement on an axis 67 on the carrier. The lever 66 is provided with a surface 68 which is normally above the level of a stop dog 68 which is vertically movable in the table 13 from a retracted position to an extended position where it lies in the path of the surface 68. Since the dog 68 does not rotate with the carrier, when it is extended upwardly it causes the lever 66 to swing counter-clockwise, as the carrier rotates counter-clockwise, thus forcing the plunger 61 outwardly. This outward movement of the plunger 61 takes place after the carrier moves a cartridge from one station, and is completed before the barrel that held the cartridge reaches the next station. As previously mentioned, the dog 68 is normally retracted so that the plunger 61 does not move out. If, however, the gauging operation which takes place at any station fails to meet the required dimension standard of that station, the dog 68 that is associated with that particular gauging station is caused to automatically move upwardly so that the cartridge will be automatically ejected as it moves from the station where it has failed to meet the required standard. As will be understood, there is a lever 66 associated with each of the ejecting plungers, and a stop dog 68 for each of the eight different stations of the gauging apparatus. The stop dog 68 which follows the seventh or unloading station is always extended so that all the cartridges that reach the seventh station are automatically ejected as they move from that station, and are thrown into a hopper 70. Thus all of the cartridges entering the hopper 70 have conformed to the requirements of the different stations of the carrier.

Immediately following the first gauging station is a receiving compartment or hopper 71 which receives articles ejected because they fail to meet the dimension requirements of the first gauging station, and similar hoppers 72, 73, 74, 75 and 76 follow the second, third, fourth, fifth and sixth stations, thus segregating the different cartridges in accordance with the tests they have failed to meet.

Figure 11:
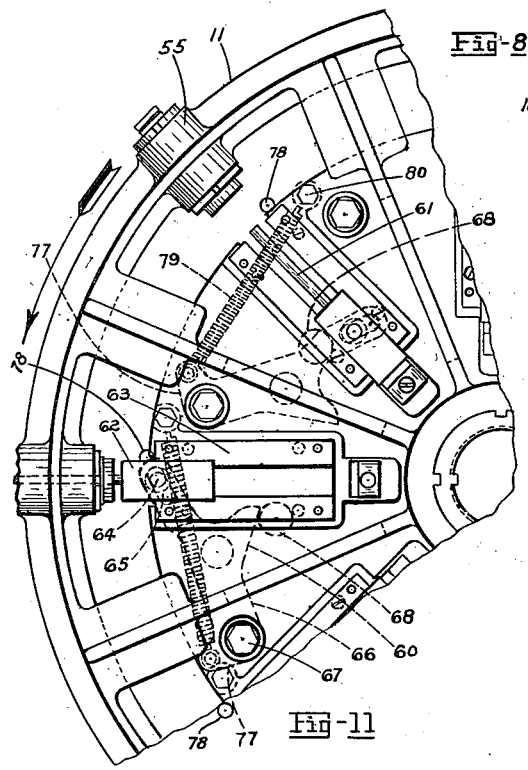
Fig. 11 is a top plan view of a portion of the rotatable cartridge carrier in cartridge ejecting position.

One of the plungers 61 is shown in Fig. 11 in its extended position, the lever 66 having been swung outwardly and being just ready to ride off of the cooperating stop dog 68 as the carrier continues its counter-clockwise movement. In this position of the lever 66 an arm or extension 77 fixed to the lever is about to contact with a returning stud 78 which projects up from the table and which is arranged at such distance from the axis of rotation of the carrier as to positively return the lever 66 to its normal position, and thus retract the ejection plunger 61 as the carrier continues its counter-clockwise rotational movement. The extension 77 of the lever clears the stud 78 when the lever is in its normal inner position. A spring 79 connected to the extension 77 of the lever at one end and to the carrier at the point 80 at the other end of the spring also acts in returning the lever as soon as the camming surface 69 rides off of a dog 68, but the stud 78 produces a positive returning action in case the spring does not operate with sufficient rapidity.

Figure 8:
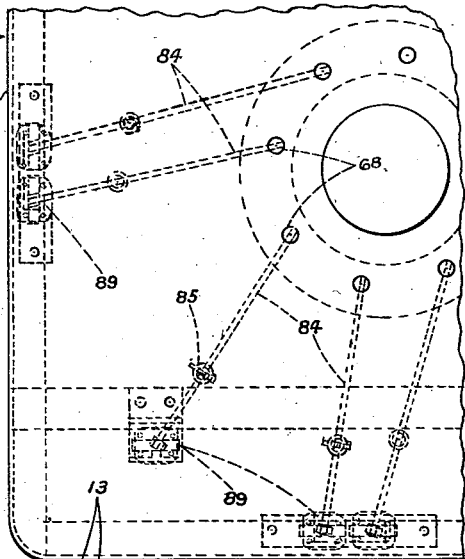
Fig. 8 is a top plan view of a portion of the housing with the rotatable cartridge carrier removed.
Figure 9:
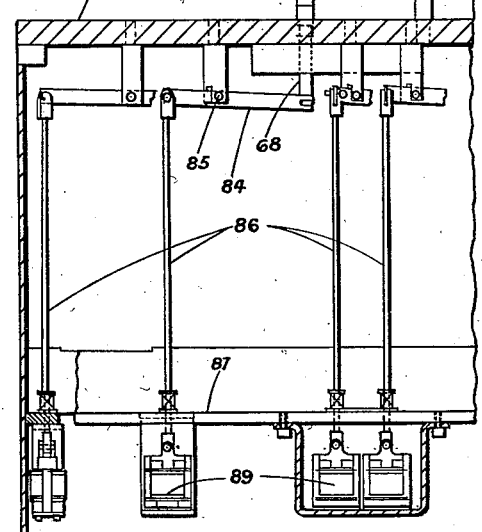
Fig. 9 is a side elevation of Fig. 8, with the end wall removed.

The dogs 68, Figs. 8, 9 and 10, are carried at the outer ends of lever arms 84 pivoted intermediate their ends at 85 and operated by links 86 which project down through a wall 87 of the housing, the lower ends of the links being operated by solenoids 89 controlled by the several gauging stations as will be presently described.

The carrier is moved in a step by step fashion by means of a Geneva mechanism (see Figs. 3, 4 and 5). The cam shaft 30 carries a gear 90 which meshes with a gear 91 fixed on a vertical shaft 92. The latter carries a pinion 93 which operates a large gear 94 fixed to a rotatable disk 95 which is thus rotated at a uniform speed. The disk 95 carries a series of weighing arms 96 which weigh the cartridges that have been supplied to them from the receiving hopper 70 after having met all the gauging tests to which they have been subjected in the carrier. On the lower end of the shaft 92 is a disk 99 provided with a pin 100 eccentric to the axis of the shaft 92 and adapted to operate in the eight slots 101 of a Geneva disk 102 fixed on the lower end of the shaft 57. As the shaft 92 rotates one revolution it thus turns the Geneva disk and the shaft 57 one-eighth of a revolution, moving a chamber or article receiving barrel of the carrier from one station to the next and then temporarily stopping it. The outer ends of the slots 101 are provided with tapered surfaces 103 which are engaged periodically at the stationary positions of the disk by a spring-pressed plunger 104, to yieldingly lock the Geneva disk in an exact position. A spring 105 back of the plunger 104 pushes the plunger radially inwardly when permitted to do so. However, an arm 106 of a bell crank lever 107 operated by a cam 108 on the shaft 92 presses the plunger 104 outwardly and compresses the spring 105 just before a rotational movement of the Geneva disk 102 is initiated, and then moves to permit the plunger 104 to move inwardly just before the next slot 101 reaches a position in alignment with it.

The shells that are supplied to the hopper 70 travel down a chute 110 which terminates in a horizontal passage 111, the lower end of which is closed by one of several arms 112 of a rotatable feeding wheel 113. This wheel 113 is periodically rotated counter-clockwise as viewed in Fig. 13 to permit one cartridge at a time to fall on a tray 115 when a tray is below the feeding wheel 113. Each tray 115, as will be apparent, is carried at the outer end of its respective weighing arms 96. At the time the cartridge falls on the tray, the tray is in a lowered position, held so by a roller 118 and a cam 119 (see Figs. 5 and 13) stationary on the fixed structure 59. The cam 119 is long enough to hold the inner end of the weighing arm 96 in a raised position while the arm is receiving the cartridge from the supply hopper, and as the disk 95 rotates, the roller 118 rides off of the cam 119 and the arm 96 can then remain with the roller 118 elevated, if the cartridge is sufficiently heavy to meet the required weighing test, or the inner end of the arm 118 can descend and raise the cartridge, if the cartridge is too light, it being understood that the inner end of the arm 96 is sufficiently weighted so that the balancing of the arm, when a cartridge is on the tray, gives the desired weighing action.

The periodic rotation of the wheel 113 is effected by a series of eight cams 120 on the periphery of disk 95. The cams periodically operate a three-armed lever 121 pivoted at 122 and connected by spring 123 to a second lever 124 which is pivoted to the lever 121 at 125. The levers 121 and 124 normally operate together, producing reciprocation of a slide block 126 which has a pawl lever 127 pivoted to it. The lever 127 operates the teeth or pins of the end of the wheel 113. A spring-pressed detent lever 128 yieldingly holds the wheel at the end of a 90° rotational step. If a cartridge becomes jammed in the feeding wheel 113 the spring 123 yields to permit a full stroke of the lever 121 without corresponding actuation of lever 124 and as this movement of lever 121 takes place it interrupts a circuit through a switch 207 because a stop screw 129 then depresses a switch operating blade 130. This opens the switch 207 and stops the operation of the driving motor, as will be presently described.

The cartridge carried by the arm 96 is rotated a part of a revolution until the cartridge reaches one of two discharge hoppers 131 and 132 (see Fig. 6). The first of these is for receiving the heavy cartridges, and the second is for receiving the cartridges that fail to meet the required weight standard. Adjacent the hopper 132 is a fixed arm 133 of sufficient height to be engaged by the end of the cartridge, if the tray is elevated, and stop further rotation of the cartridge so that as the tray 115 moves on, the cartridge is held and drops into the hopper 132. A similar arm is provided adjacent the hopper 131 to stop rotational movement of the heavy cartridges, this arm being low enough to engage the cartridges of the tray is in its lowered position, the trays that are holding the light cartridges passing over the top of the arm without interference.

Just ahead of the hopper 131, the outer end of the weighing arms, if the tray is depressed, engage a suitable feeler to close an electric contact 279 (see Fig. 20) and operate a counter under the control of counter coil 280. This counts the good cartridges that have met the required weight test.

The several gauges that are employed at the several gauging stations may take a number of different desired forms depending on the gauging operations to be performed on the article, but as herein shown the gauging operations performed at the successive stations are as follows: At the loading stations cartridges that are too great in their lengths are automatically ejected as they move on from the loading station, because of the interruption of a circuit by the relative movement of sleeve 44 in the slide block as previously described. At the first gauging station the chamber depth of the shell is measured or compared with a cartridge of standard size. At the second gauging station the ejector groove diameter is checked. At the third station the percussion depth is checked. At the fourth station the head diameter is checked and at the fifth and sixth stations the over-all length and the head thickness are checked. The gauge heads employed at these several stations are preferably constructed in accordance with the prior patent of W. F. Aller, No. 2,254,812, and as shown in Fig. 15 the gauging head 140 employed at the first gauging station embodies an operating plunger 141 adapted for axial movement in the gauge housing. The gauge head is provided with two adjusting knobs 142 which control the normal position of over-size and under-size electric contacts, not shown, which are arranged at opposite sides of a movable pointer operated by a spring supported block as described in the patent mentioned. The adjusting knobs 142 can be set in accordance with a pair of cartridges or masters one of which is of a maximum acceptable size and the other of a minimum acceptable size so that both contacts will remain in a normally closed condition, and then one or the other of these contacts may be opened by a cartridge undergoing test if the cartridge is over-size or under-size in the particular dimension gauged by that gauging device. On the end of the plunger 141 of this first gauging device is an end piece 144 which is contacted and operated by the end of the shell that reaches that station. As the cartridge moves into the first gauging station, the gauging head is held in a retracted position so that the end of the shell will not press against the end piece 144 of the gauging plunger. The gauge head then automatically moves radially inwardly to a normal gauging position. To permit this movement of the gauge head, the latter is supported by a pair of flexible spring blades 146 (see Fig. 15). The lower ends of these blades are fixed to a part 147 stationary on the table 13. Only a limited travel of the gauge head is provided for, as the part 147 has a pair of upward extensions 148 with sufficient space between them to permit movement of a lug 149 on the gauge head. A spring 150 in one of these extensions 148 urges the lug 149 towards the center of the carrier, but the gauge head is held out until after the cartridge has been stopped in gauging position, by a cam operated arm 151 engaging a lug 152 fixed on the gauge head. The arm 151 is controlled by a cam 153 (see Fig. 3) on the cam shaft 30. This cam operates a plunger 154 (as shown in Fig. 4), to move the lever 151 illustrated in Figs. 3 and 15.

Figure 2:
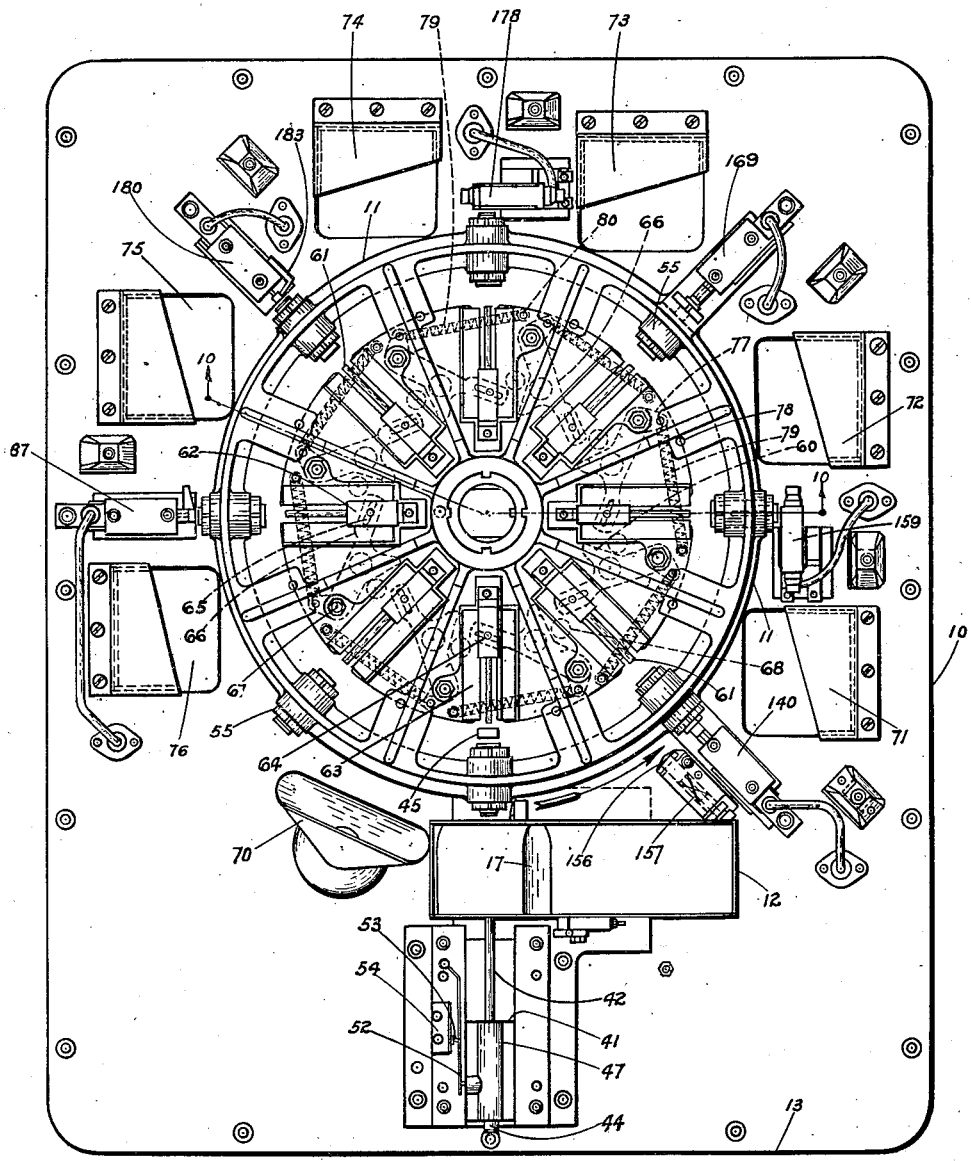
Fig. 2 is a top plan view of the gauging apparatus.

Just before the cartridge is moved into gauging position at the first gauging station, the end of the shell is subjected to a predetermined yielding pressure by wiping over a spring-pressed plunger 156 (Fig. 2). The spring 157 which operates this plunger produces a predetermined force on the cartridge so that the several cartridges that move successively into the first gauging station will be uniformly seated against the tapered portion 43 of the different barrels or receivers of the carrier.

Before the cartridge moves away from the first gauging station, following the first gauging operation, the cam 153 causes an outward movement of the gauge head 140, to draw back the end piece 144. As the shell moves out of the first gauging station, the stop dog 68 of that gauging station is extended if the shell is either over-size or under-size, by energization of its respective solenoid 89 through a circuit closed in the gauging head. If the shell conforms to a desired size standard of shell length, then it is carried along to the next gauging station.

At the second gauging station (Figs. 2 and 16) the gauge head 159 is provided to gauge the ejector groove diameter. The end of the cartridge passes between a pair of fingers 160 and 161, the upper gauging finger 160 being arranged on a block 162 carried by a pair of parallel spring blades 163 which are mounted at their other ends on an L-shaped bar 164. The lower end of this bar carries the gauging finger 161 and the gauge head 159 is secured to the upper end of the bar. The bar 164 is mounted for vertical yielding movement on the stationary support 165 by means of a pair of parallel spring blades 166 so that the lower gauging finger 161 is yieldingly held against one side of the groove and the upper gauging finger 160 is yieldingly held against the upper side of the groove. The block 162 moves the operating plunger 167 of the gauge head in accordance with the relative distance between the fingers 160 and 161.

At the third gauging station (see Figs. 2 and 17), the gauge head 169 is positively moved radially outwardly by a lever 170 (see Fig. 3), controlled by a cam 171 and a cam operated plunger 172 (Fig. 4), generally similar in construction to the operating mechanism of the gauge head of the first gauging station. This gauge head 169 is provided with an operating plunger 173 having a gauging tip 174 that moves into engagement with the percussion cap, to measure the percussion depth, the end of the shell around the percussion cap engaging an abutment surface 175 on the spring held bar 176 that carries the gauge head.

At the fourth gauging station, the gauge head 178 is arranged in a generally similar manner to the gauge head 169, but measures the head diameter.

At the fifth gauging station (see Figs. 2 and 18), the gauge head 180 gauges the length of the cartridge. This gauge head has an operating plunger 181 provided with gauging end 182 which contacts the outer end of the shell. The gauge head 180 is fixed in position and is also provided with a stationary arm 183 which prevents the end of the shell, as the shell moves into gauging position, from pressing sideways on the gauging tip 182. When the cartridge is in gauging position at this station, it is loosened from its tight engagement in the article holder or barrel by a cam 195 which is fixed on the table 19 and which is so inclined as to cam the cartridge radially outwardly as the cartridge moves into gauging position, the cam surface 185 then holding the pointed end of the cartridge so as to locate the cartridge in a definite position with respect to the gauge head.

Following the fifth gauging station, the cartridges are brought to a gauge head 187 which measures the head thickness, that is the distance between the groove and the end of the shell. The end of the shell engages the gauging tip 188 on the end of gauging plunger 189, while the groove of the cartridge is engaged by a pair of fixed gauging points 190 provided on the stationary block 191 which carries the gauge head. The fixed gauging points 190 enter the groove in the shell and are arranged generally in the same manner as the locating points illustrated in Fig. 16.

Those cartridges that satisfactorily pass all of the gauging operations from the loading station to the sixth gauging station remain in the carrier as the carrier reaches the seventh station, while the rejections from the sixth station are thrown out into the hopper 76. As the cartridges leave the seventh station all those reaching this station are thrown out into the hopper 70, since the stop dog 68 for that seventh station is always in an elevated position.

The cartridges supplied to the several hoppers travel down on individual chutes and are thus supplied to individual receptacles or outlets some of which are shown on the side of the housing in Fig. 1 while others are located on the other sides of the housing. Those cartridges that go into the hopper 70 are then supplied to the weighing arms that have been previously described.

Figure 20:
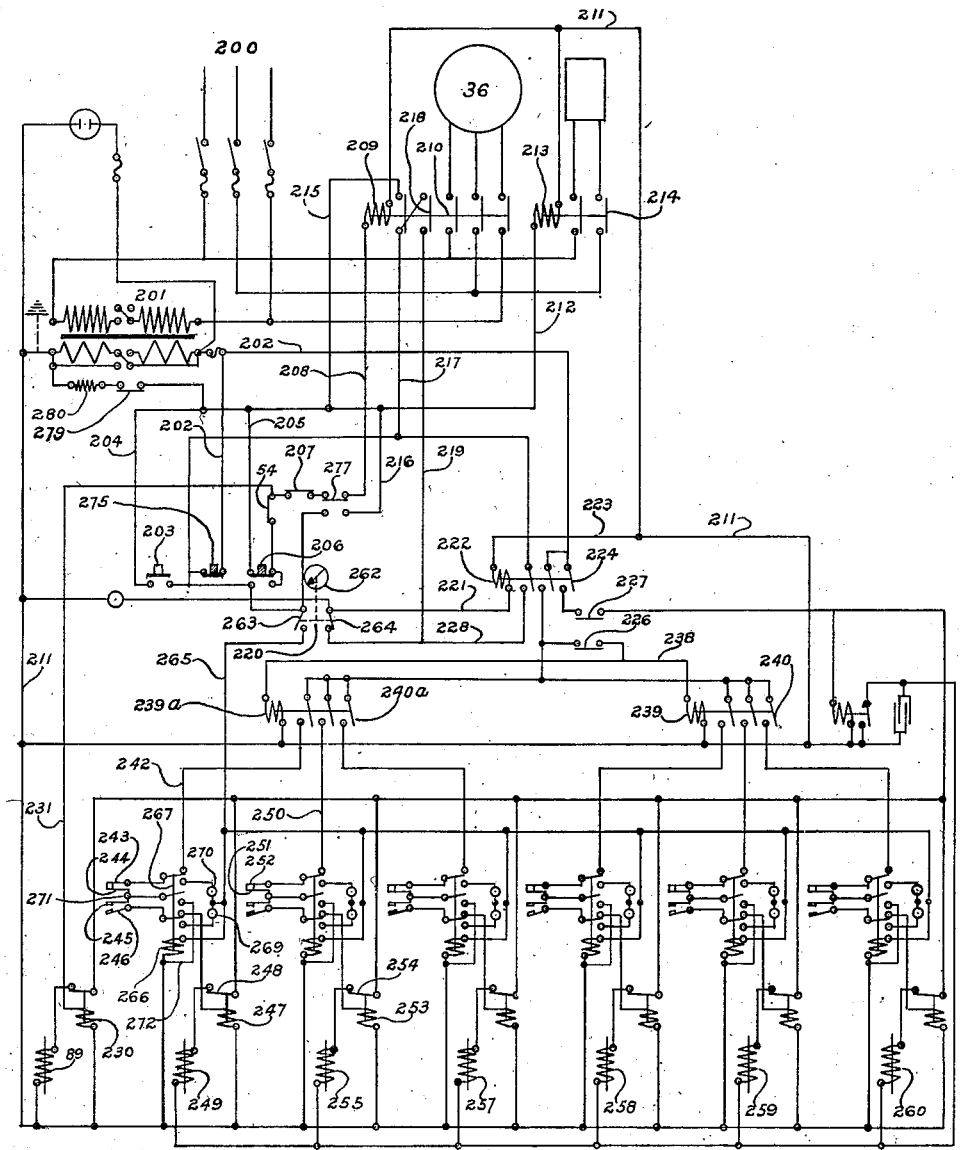
Fig. 20 is a diagrammatic view of the electrical connections.
Figure 21:
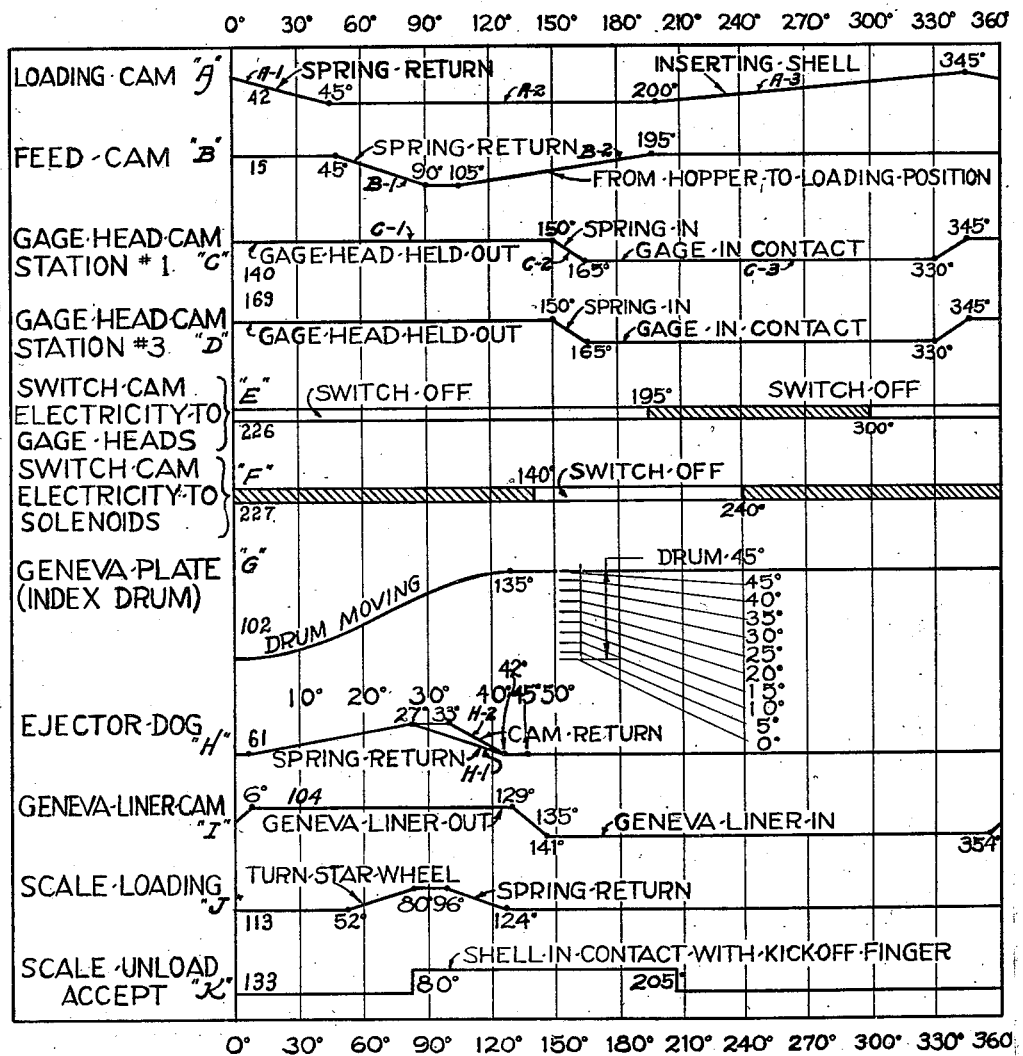
Fig. 21 is a diagrammatic view showing the timing of the different operations.

Fig. 20 taken in connection with Fig. 21 shows the electrical connections and the relative timing of the different operations. Current is supplied from a power source 200, through a transformer 201 to a line 202, and if the manually operable starting switch 203 is closed a circuit is completed from 202 through wires 204, 205 through a normally closed jog switch 206, then through the normally closed loading switch 54, through the normally closed scale loading switch 207, wire 208 and motor operating relay 209 which is energized to close the switch 210 and start the motor 36 in operation. A circuit is completed from the relay 209 through return wire 211. At the same time the motor is energized a circuit is completed from line 204 to line 212 leading to a relay 213 which controls a brake switch 214 so that the brake is taken off. When a circuit is completed through the relay 209, a holding circuit 215 is energized which maintains the motor control switch 210 closed even after the starting switch 203 is released. When the relay 209 closes the motor switch 210, it also completes a circuit through wire 202, switch 275, through lead 217, switch 218, and wire 219, closed selection switch 220 and wire 221, energizing relay 222, the current returning through wire 223 to the wire 211. Energization of the relay 222 closes a three pole switch 224 and thus connects the current supply to the several gauging heads, when the normally open switches 226 and 227 are closed. The energization of the relay 222 also energizes the wire 228 which forms part of a holding circuit for the relay 222, to keep the switch 224 closed.

Normally the stop dog operating solenoid 89 associated with the loading station is de-energized, as the relay 230 associated with it is energized through wires 231 and 211. This circuit is through 231, closed switch 54, jog switch 206, wires 205 and 204, closed start switch 203, closed stop switch 275, wire 202 and across the power source to 211. If the relay 230 is de-energized because a cartridge that is too long has caused the switch 54 to open at the loading station, the circuit through the ejecting solenoid 89 will be closed and the cartridge will be ejected when it moves out of loading position. Opening of the switch 54 also causes de-energization of relay 209, and the motor stops.

At the proper time in the sequence of operations, the switch 226 is automatically closed by a plunger 235 operating in a cam groove 236 on the side of cam 171, (Fig. 4) to supply current after the cartridges have reached their gauging positions and are stationary, to the several gauge heads. These gauge heads are not supplied with current during the time their contacts are being moved by the entrance of the cartridges into gauging position, and consequently circuits are not made and broken by the several gauge contacts, the current flow taking place under the control of the cam operated switch 226 as previously described. The switch 227 previously mentioned is also under control of a second cam groove in the cam 171, switch 226 being arranged in back of and adjacent to switch 227. The switch 227 is for the control of current to the several solenoids that operate the stop dogs.

When the switch 226 closes, it completes a circuit from wire 238 through relay coil 239 and closes the switch 240 which is normally open. In parallel with the relay 239 there is a second relay 239a and a second switch 240a, these two switches supplying current to the several gauge heads. Thus circuits are closed by switches 240 and 240a through the several gauges 140, 159, 169, 178, 180 and 187.

Assuming the cartridge checked at the first gauging station is of the correct or intended size, current will flow through the wire 242, switch blades 243 and 244, switch blades 245 and 246 and relay 247 to the return wire 211. The energization of relay 247 pulls over the switch blade 248 and opens the circuit to the stop dog-operating solenoid 249. This occurs before current is supplied to the several solenoid circuits through the cam controlled switch 227. This solenoid 249 will thus remain de-energized and the stop dog will not be projected.

Assume that at the second gauging station the cartridge checked is over-size. No circuit will be completed from the wire 250 through the contacts 251 and 252 as these are now separated, and the relay coil 253 will not be energized so switch blade 254 remains in the position shown in Fig. 20 and maintains the circuit through the solenoid coil 255 so that the corresponding stop dog 68 is raised when the switch 227 closes. The cartridge will therefore be ejected. If the cartridge is under-size instead of over-size, the same result will be obtained.

As will be understood, the various solenoid coils 257, 258, 259 and 260 and their controlling relays of the third, fourth, fifth and sixth gauging stations are similarly arranged with respect to their gauge heads as will be seen from the drawings, each gauge head thus controlling its own individual stop dog 68 according to whether or not the cartridge conforms to the desired dimension range that is permitted the pointer of any gauge before either of its pairs of contacts is opened.

A knob 262 for switch 220, adapted to be manually controlled, can close a normally open switch blade 263 and at the same time open the normally closed switch blade 264, this operation opening the holding circuit through the relay 222 and thus causing the switch 224 to open to prevent the flow of current to the switches 240 and 240a. Current, however, is supplied to the gauging devices with the switch blade 263 closed, through a wire 265 to energize the relays 266 of the several gauge devices and move the several switches 267 of these devices from the position shown in full lines so as to complete a circuit for each gauging head through a pair of lamps 269 and 270 one of which is red and the other green in color. Current then flows through the closed contacts 243, 244, 245 and 246 and the return wire 271 to the wire 272, energizing both of these lamps if both pairs of switch contacts are closed. The selection switch 262 is thus operated when setting up the gauges, using a standard size cartridge, the energization of the ejection dog-operating solenoids being prevented under these conditions so that the shell will not be thrown out. If one or the other pairs of contacts 243, 244, 245 or 246 is open, with a standard size cartridge in place at the gauging station, either the green or the red light will show, indicating whether or not an over-size or under-size condition exists, and permitting the operator to manipulate the control knobs on the gauge head until both lights are energized. In this way the several gauging devices may be adjusted in conformity with the particular dimensions to be gauged, and after the several adjustments have been made, the operator turns the selection switch 262 to close the switch blade 264 and open the lamp energizing circuit.

To stop the operation of the machine, the operator opens a stop switch 275 and breaks the holding circuit leading to the switch 224. 277 designates a normally closed automatically operating switch controlled by the scale loading mechanism so that if the scale loading mechanism should jam this switch would be opened and thus interrupt the current flow to the motor controlling switch relay 209.

A normally open switch 279 is provided in a circuit across the secondary winding of the transformer, for periodically energizing a coil 280 which controls the magnetic counter, the switch 279 being automatically operated by a weighing arm when in lowered position just before the arm reaches a position where the cartridge it carries is pushed off of the carrying tray.

In Fig. 21, the line A indicates the action of the loading cam operating the plunger 43, A—1 showing the spring return action, A—2 the stationary position, and A—3 the movement when the shell is being inserted. Line B indicates the timing of the feed cam by which the feed block 15 is controlled, B—1 indicating the spring return and B—2 the motion from the hopper into supply position. Curve C shows the action of the first gauge head 140 at the first gauging station. At C—1 the gauge head is held out, at C—2 the spring returns it inwardly and at C—3 the gauge is in gauging position. Curve D shows the movement of the third gauge head 169. Curve E shows the timing of the cam operated switch 226 and Curve F shows the timing of the switch 227 which controls the flow of electricity to the dog operating solenoids. Curve G shows the action of the Geneva plate 102 which indexes the rotatable carrier, one full revolution of the cam shaft causing one step movement of 45° of the carrier. Curve H shows the movement of an ejector dog, the part H—1 showing the spring return action while the portion H—2 shows the positive action of plunger 61 under the control of the positively acting camming lugs 78. Curve I shows the motion of the Geneva locking cam, operating plunger 104, which locates the carrier. Curve J shows the scale loading action of the wheel 113. Curve K shows the scale unloading action by finger 133 for cartridges of sufficient weight.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus of the character described comprising a support, a carrier rotatably mounted on said support and having a series of radially extending annularly spaced article receivers, means for intermittently rotating the carrier about a vertical axis to advance articles carried thereby from a supply station through successive gauging stations, means for supplying articles in a direction radially of the carrier axis into said receivers, a gauge holder at one of the gauging stations, a gauge unit, parallel spring blades attached to said holder and said unit and supporting the unit for yielding movement towards and from the carrier, means for automatically positively moving said gauge unit radially away from the carrier in time with the step-by-step movements of the carrier, and for releasing the gauge unit for free support on said spring blades after an article is in gauging position, and means controlled by the said gauge unit for positively moving the article gauged radially out of the carrier if it fails to meet a required standard.

2. Gauging apparatus of the character described comprising a support, a carrier rotatably mounted on said support for movement about a vertical axis and having a series of article receiving chambers, means for intermittently rotating said carrier to advance articles placed therein from a supply station through a series of gauging stations, a gauge unit on said support at each of the gauging stations, means controlled by said gauge units for causing ejection of articles from the carrier that fail to meet the gauging test, means for ejecting the articles remaining in the carrier after all the gauging tests, a rotatable weighing apparatus coaxial with said carrier and below the carrier for receiving and weighing articles ejected from the carrier by said last named means, and means for rotating said weighing apparatus in timed relation with said carrier.

3. Gauging apparatus of the character described comprising a support, a carrier rotatably mounted on said support for movement about a vertical axis and having a series of article receiving chambers, means for intermittently rotating said carrier to advance articles placed therein from a supply station through a gauging station, a gauge unit on said support at the gauging station, means for causing ejection of articles from the carrier, a rotatable weighing apparatus coaxial with said carrier and below the carrier for receiving and weighing articles ejected from the carrier by said last named means, and means for continuously rotating said weighing apparatus at a uniform speed in timed relation to the operation of said carrier.

4. Gauging apparatus of the character described comprising a support, a carrier operably mounted on said support and having a series of regularly spaced article receivers, means for intermittently operating the carrier to advance articles carried thereby from a supply station through successive gauging stations, means for supplying elongated articles successively into a position aligned with the supply station, supply means applying articles to said receivers, gauging means at the gauging stations, a fixed stop independent of said article receivers and located adjacent the supply station against which overlength articles abut when supplied to the carrier, and means including an electric switch controlled by said supply means for automatically controlling the ejection of an article which projects from the carrier beyond a predetermined limit, when the article is moved from the supply station.

5. Gauging apparatus of the character described comprising a support, a carrier rotatably mounted on said support and having a series of annularly spaced article receivers, means for intermittently rotating the carrier to advance articles carried thereby from a supply station through gauging stations, means for supplying articles successively into a position aligned with the supply station, a feed plunger for successively pushing the articles into said receivers, gauging means at the gauging stations, drive means for operating said feed plunger, said drive means having a yielding connection with said feed plunger to normally operate therewith but movable relatively to said feed plunger when the latter is held against movement, switch means operated upon yielding movement of said drive means with respect to said feed plunger, and means controlled by said switch means for automatically controlling the ejection of an article which projects from the carrier beyond a predetermined limit.

6. Gauging apparatus of the character described comprising a support, a carrier operably mounted on said support and having a series of regularly spaced article receivers, means for intermittently operating the carrier to advance articles carried thereby from a supply station through successive gauging stations, means for supplying elongated articles successively into a position aligned with the supply station, a feed plunger for successively applying the articles to said receivers, gauging means at the gauging stations, telescope means including an electric switch for operating said feed plunger, and electrically operated means controlled by said switch for automatically controlling the ejection of an article which projects from the carrier beyond a predetermined limit as the article is moved from the supply station and before it reaches the first gauging station.

7. Gauging apparatus of the character described comprising a support, a carrier rotatably mounted on said support and having a series of annularly spaced article receivers, means for intermittently rotating the carrier step-by-step to advance articles from a supply station through successive gauging stations, means for supplying articles to the carrier at said supply station, gauge units at the gauging stations, means controlled by said gauge units for ejecting from the carrier those articles that fail to meet a required standard, means causing the ejection of the articles that meet the required standards of all of said gauge units, a rotatable member co-axial with said carrier and having annularly spaced weighing arms for successively receiving the articles ejected from said last named means, means for rotating said member in timed relation to said first carrier, said weighing arms being adapted to carry an article in an elevated or lowered position according to the weight of the article, means for positively controlling the height of said arms when they reach a predetermined point in the rotation of said member, stop means adapted to be successively engaged by articles on said arms when in a lowered position, and stop means adapted to be successively engaged by the articles on said arms when in a raised position.

8. Gauging apparatus of the character described comprising a support, a carrier rotatably mounted on said support and having a series of annularly spaced article receivers, Geneva means for intermittently rotating the carrier step-by-step to advance articles from a supply station through successive gauging stations, means for supplying articles to the carrier at said supply station, gauge units at the gauging stations, means controlled by said gauge units for ejecting from the carrier those articles that fail to meet a required standard, means causing the ejection of the articles that meet the required standards of all of said gauge units, a rotatable member coaxial with said carrier and having annularly spaced weighing arms for successively receiving the articles ejected from said last named means, a drive member for said Geneva means, means operable by said drive member for continuously rotating said rotatable member, said weighing arms being adapted to carry an article in an elevated or lowered position according to the weight of the article, means for positively controlling the height of said arms when they reach a predetermined point in the rotation of said member, stop means adapted to be successively engaged by articles on said arms when in a lowered position, and stop means adapted to be successively engaged by the articles on said arms when in a raised position.

WILLIS FAY ALLER.